(12) United States Patent
Dinh

(10) Patent No.: US 7,151,218 B2
(45) Date of Patent: Dec. 19, 2006

(54) ELECTRICAL TERMINATION COMPONENT BRACKET

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/764,105

(22) Filed: Jan. 23, 2004

(65) Prior Publication Data

US 2005/0082078 A1   Apr. 21, 2005

Related U.S. Application Data

(60) Provisional application No. 60/513,094, filed on Oct. 21, 2003.

(51) Int. Cl.
*H02G 3/08* (2006.01)

(52) U.S. Cl. ............... 174/58; 174/50; 174/53; 248/906

(58) Field of Classification Search .......... 174/50, 174/58, 63; 220/3.7, 3.8; 439/535; 248/906
See application file for complete search history.

(56) References Cited

U.S. PATENT DOCUMENTS

| | | | | |
|---|---|---|---|---|
| 2,808,172 A | * | 10/1957 | Buckels | 220/3.4 |
| 2,989,206 A | * | 6/1961 | McAfee | 220/3.7 |
| 4,854,093 A | | 8/1989 | Kellom | 52/28 |
| 4,927,039 A | * | 5/1990 | McNab | 220/3.7 |
| 5,042,673 A | * | 8/1991 | McShane | 220/3.7 |
| 5,775,032 A | | 7/1998 | Lacy | 52/28 |
| 5,931,325 A | * | 8/1999 | Filipov | 220/3.7 |

\* cited by examiner

*Primary Examiner*—Dhiru R. Patel
(74) *Attorney, Agent, or Firm*—Hoffmann & Baron, LLP (57) ABSTRACT

An electrical box bracket is positionable in one of two reversible positions to accommodate wall boards of two different thicknesses. The bracket includes a flange and an access member for providing access therethrough. In one of the two reversible positions, the access member accommodates wall board of one thickness and in the other reversible position the access member accommodates wall board of the other thickness. The bracket may be mounted directly to a stud or can be mounted to an outlet box which is attached to the stud.

7 Claims, 5 Drawing Sheets

ELECTRICAL TERMINATION COMPONENT BRACKET

CROSS REFERENCE TO RELATED APPLICATIONS

This application claims priority to U.S. Provisional Patent Application No. 60/513,094, filed Oct. 21, 2003.

FIELD OF THE INVENTION

The present invention relates generally to a bracket for supporting an electrical termination component within wall board opening. More particularly, the present invention relates to a reversible electrical component bracket for accommodating wall board of different thicknesses.

BACKGROUND OF THE INVENTION

In commercial and residential construction, electrical components are mounted adjacent studs or other structural members to which wall board is applied. Various devices have been developed to support the electrical components, which may include electrical switches and receptacles and low voltage components such as data and communications terminals, through openings in the wall board. Typically, when employing devices such as switches and receptacles which terminate electrical wires, an outlet box is installed by attaching the box to an edge of the stud. The box is positioned on the stud to extend outward of the stud a sufficient distance so that the wall board attached over the stud will be flush with the open face of the box. In low voltage applications such as with data and communications terminations, a bracket may be employed which is supported to the stud and allows mounting of the low voltage termination thereto. The bracket would also accommodate wall board which is attached over the stud.

For most commercial and residential applications, wall board is manufactured in two different thicknesses commonly, ½" and ⅝". This requires the electrical component installer to know the thickness of wall board being used at a particular site so as to properly position the box or bracket on the stud. In the alternative, the wall board installer must reposition the box or bracket on the stud. Either technique is time consuming, costly and error prone.

One solution to this problem is seen in U.S. Pat. No. 4,927,039. Therein described is a reversible bracket which is attached to the front face of the outlet box. An external wall board mounted thereto is adjustably positioned with respect to the front face of the box to adjust the position of the wall board with respect to the box. While adequately providing compensation for variation in wall board thickness, the device of the '039 patent design does so by adjusting the depth of the box. Thus, the resulting box for a ⅝" wall board is shallower than the resulting box for a ½" wall board.

It is desirable to provide a bracket which will accommodate wall board of different thickness either for use with an electrical box or for directly accommodating an electrical component.

SUMMARY OF THE INVENTION

The present invention provides a bracket for supporting an electrical termination component and for supporting wall board thereagainst. The bracket defines a bounded access member for accessing said interior of said box. The access member includes spaced apart opposed extending rims designed for flush position with two wall board thicknesses respectively. The flange of the bracket extends from the access member at a location non-equidistant from said rims.

The flange of the bracket of the present invention may be attachable directly to an outlet box. The box includes a back wall with a perimetrical side wall extending from the back wall and an opposed open face. The bracket includes a generally planar flange positioned adjacent an edge of the side wall for spanning the open face of the box. The planar flange includes a bounded opening therethrough for accessing the box interior.

The bounded opening is defined by a first wall extending from one side of said planar flange a first distance and a second wall extending from the other side of said flange a second distance different from the first distance.

In a method aspect, the present invention provides for the attachment of an outlet box to a stud. A bracket is provided having a generally planar flange and an opening therethrough. The opening is bounded by a first extending wall, extending from the flange a first distance in a first direction. A second extended wall extends from the flange in an opposite direction a second distance different from the first. The bracket is attached to the box and the box is attached to the stud.

DETAILED DESCRIPTION OF THE PREFERRED EMBODIMENTS

Figure 1:
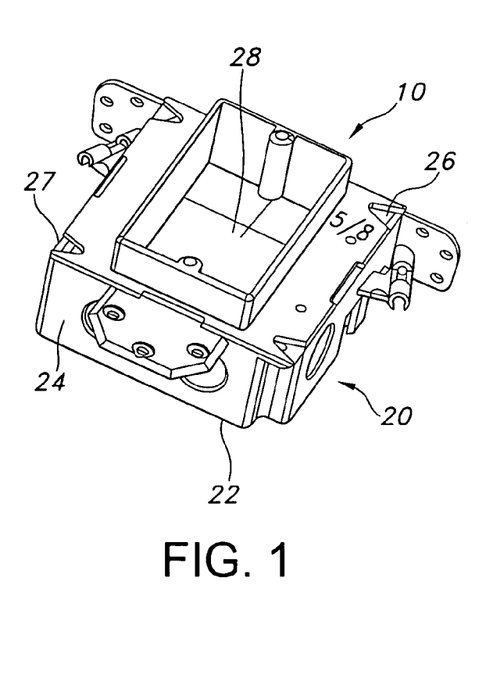
FIGS. 1 and 2 are a top perspective views of the bracket of the present invention and may be mounted to a conventional electrical outlet box.
Figure 2:
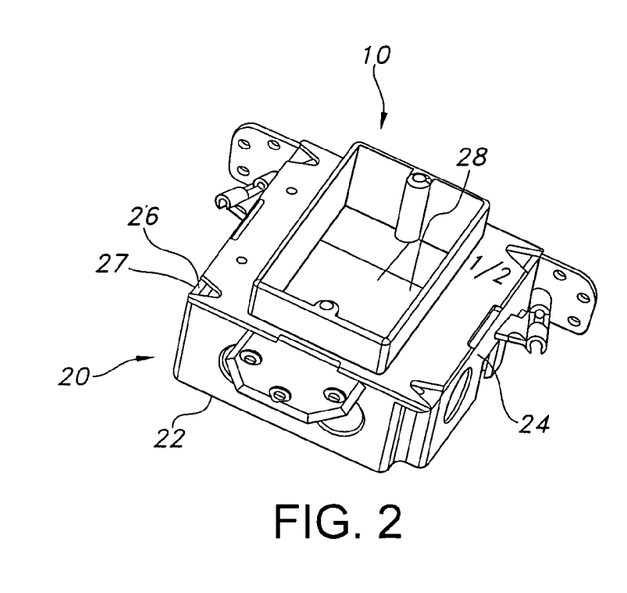
Figure 3:
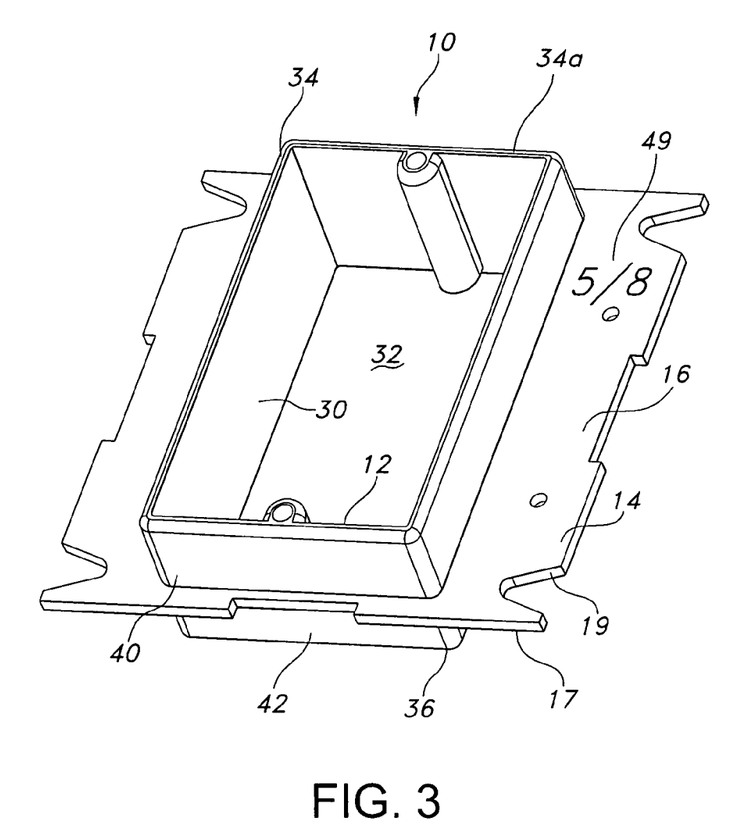
FIGS. 3 and 4 are perspective views of the opposite sides of the bracket of FIG. 1.
Figure 4:
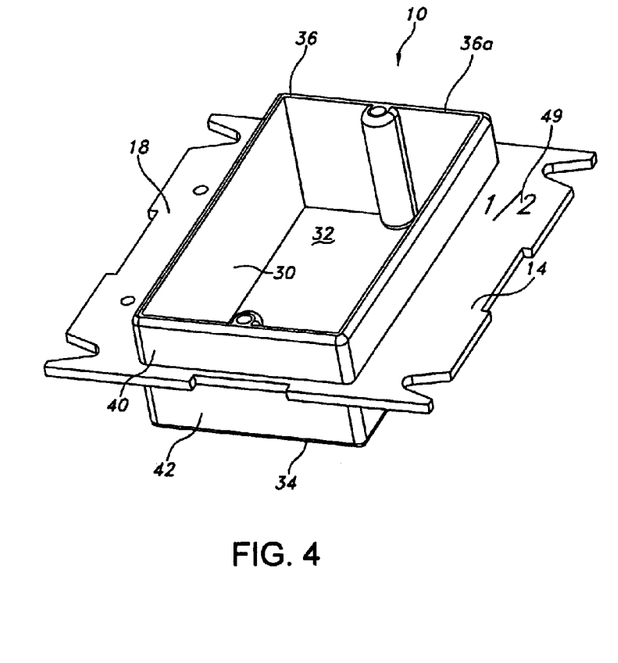

Referring to FIGS. 1–4, the present invention provides a bracket 10 which may be mounted in one of two reversible orientations. The bracket 10 of the present invention may be employed over an electrical outlet box 20 shown in FIGS. 1 and 2 where the box itself is mounted to a stud (not shown). In the alternative, the bracket itself, such as shown in FIGS. 3 and 4, may be mounted directly to the stud for supporting low voltage electrical terminations without use of an electrical box.

Referring more specifically to FIGS. 1 and 2, a conventional, commercially available electrical outlet box 20 is shown. Box 20 is a square outlet box typically formed of metal. Box 20 includes a back wall 22, a perimetrical side wall 24, an open front face 26, an opposite back wall 22 and a box interior 28. The side wall 24 may include knock-out openings 25 to permit entry and egress of electrical wires (not shown).

While a metallic square box is shown, other configurations, shapes and designs of boxes such as square or octagonal boxes may also be employed. Further, box 20 may be formed of other materials such as plastic. Box 20 typically accommodates electrical power wires. Box 20 typically allows termination of the wires to termination devices (not shown) such as receptacles, switches and the like, which are accessed through the front face 26 of box 20.

Box 20 is designed to be mounted to the side of a stud or other structural member used for attachment wall board 25

Figure 5:
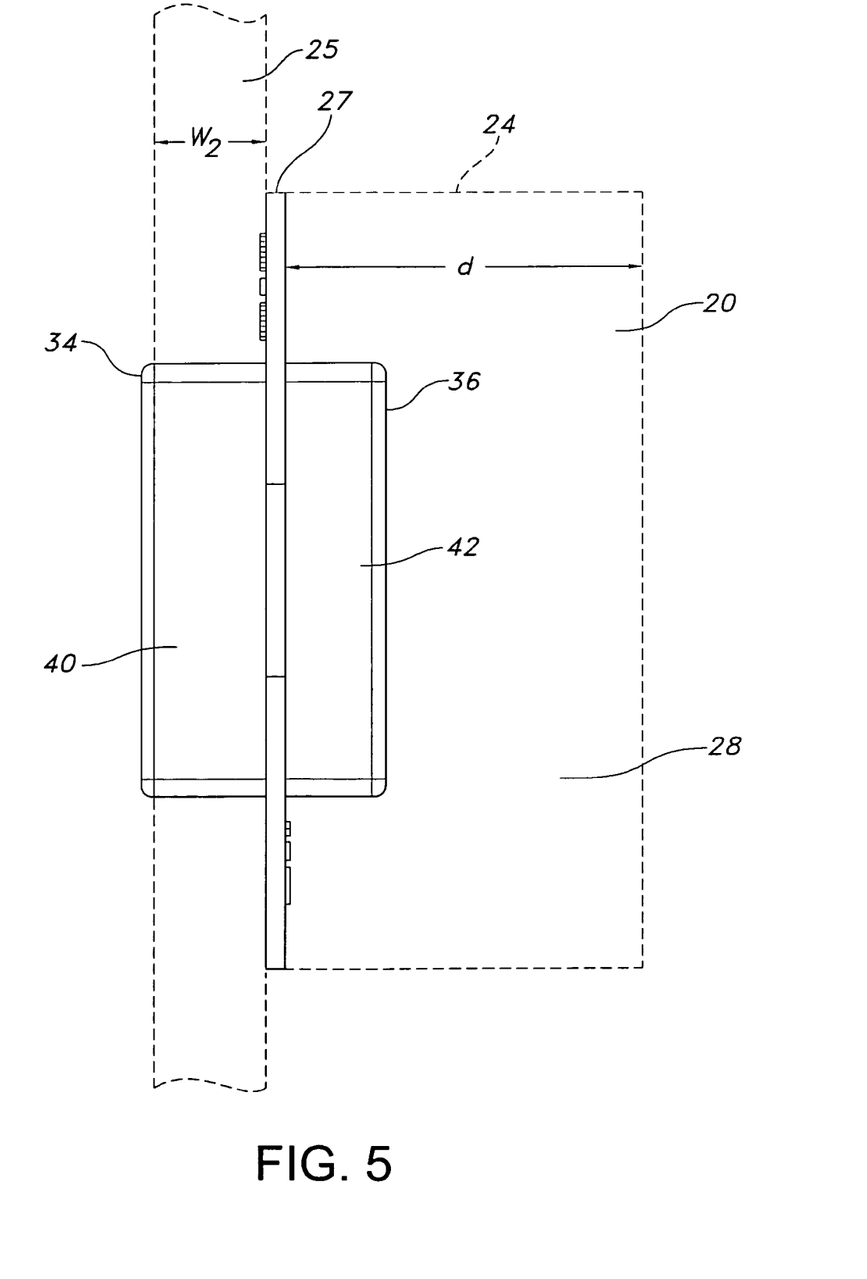
FIGS. 5 and 6 are side showings, partially in phantom, of the bracket of the present invention attached to an outlet box and supporting respectively wall board of two different thicknesses.
Figure 6:
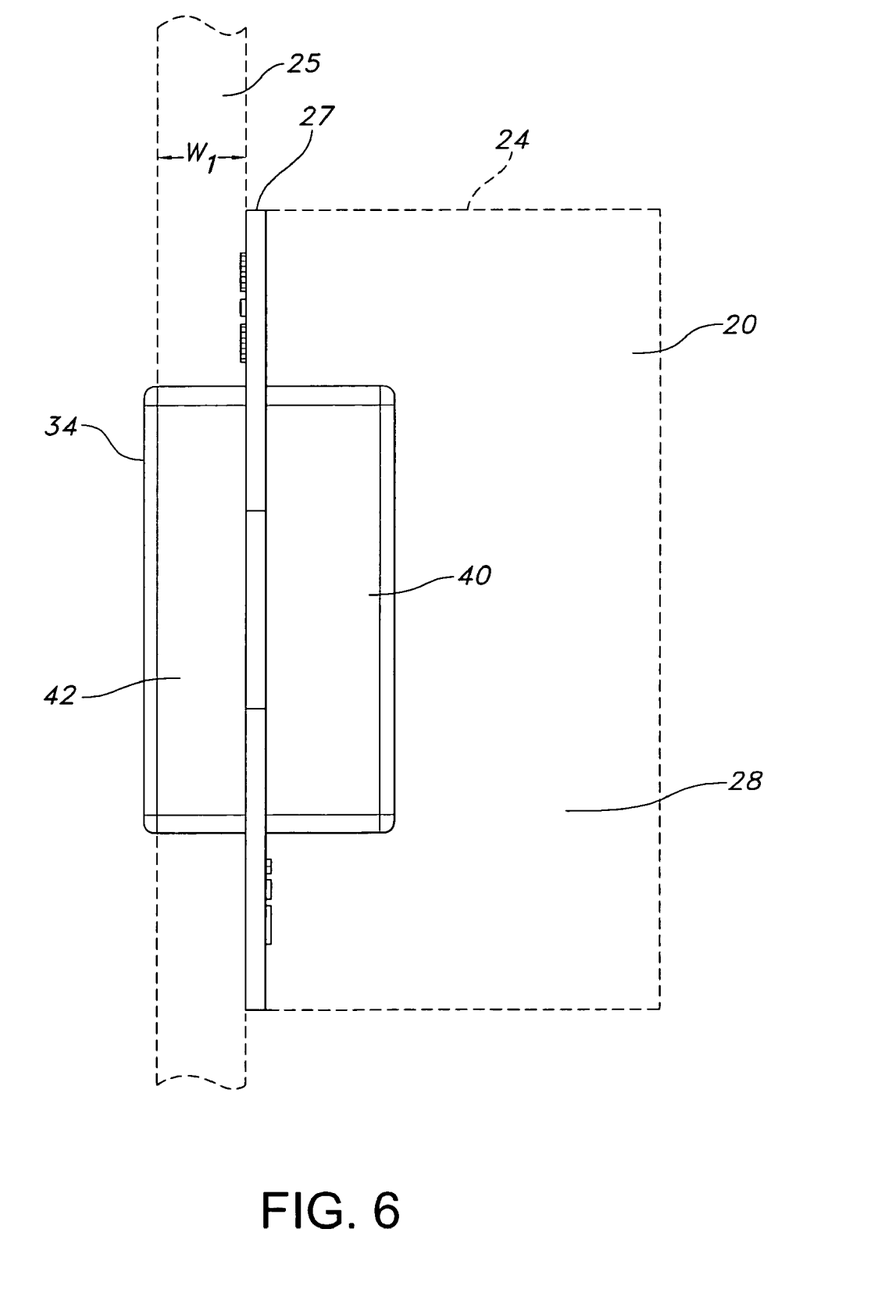

(FIGS. 5 and 6). The side walls 24 at box 20 may include attachment hardware such as a nail slot 26 to support fasteners which secure the box 20 to the stud. In the present illustrative embodiment, box 20 is designed to be mounted so that the upper edge 27 of the side wall 24 is mounted generally flush to the surface of the stud against which the wall board will be positioned.

Bracket 10 of the present invention shown in more detail in FIGS. 3 and 4 is an integral member preferably formed of plastic, however, other materials such as metal may also be employed. Bracket 10 includes an access member 12 and a flange 14 which bounds access member 12.

Flange 14 is generally a planar member having a first surface 16 and a second opposed surface 18. The opposed surfaces 16 and 18 are designed to accommodate wall board 25 thereagainst. The opposed surfaces 16 and 18 are also designed to be mounted over the open face 26 of box 20 as shown in FIGS. 1 and 2. One of surfaces 16 or 18 is mounted onto the upper edge 27 of side wall 24. The outer edges 17 of flange 14 include recesses 19 thereabout to allow securement hardware (not shown) to mount the flange 14 to tabs (also not shown) on the upper edge 27 of side walls 24.

As will be described in further detail herein below, bracket 10 can be used in reversible fashion to accommodate wall board of two different thicknesses.

Extending through flange 14 is access member 12. Access member 12 is a rectangular member having side walls 30 that form a bounded rectangular opening 32 through flange 14. Access member 12 includes a pair of spaced apart mounting elements 37 and 39 which are provided to mount a commercial electrical component therein, such as a switch, receptacle or other wire termination component. The mounting elements 37 and 39 extend through and are accessible on either side of access member 12 so that components can be mounted to either side of flange 14. As shown in FIGS. 3 and 4, flange 14 extends outwardly from sidewall 30 of access member 12 at a location that is non-equidistant from opposed rims 34 and 36 which are defined at opposite distal ends 34a, 36a of side wall 30. The arrangement defines an extending boundary wall 40 on one side of flange 14 and an extending boundary wall 42 on the other side of flange 14. The extending boundary wall 40 shown in FIG. 3 is of greater length than the extending boundary wall 42 as shown in FIG. 4.

It is contemplated that the extending boundary wall 40 should extend a length equal to the thickness of one type of wall board. In the present illustrative embodiment, extending boundary wall 40 has a length of ⅝" to correspond and accommodate wallboard of ⅝" thickness. Similarly, extending boundary wall 42 has a length of ½" to correspond and accommodate wall board of ½" thickness. Other combinations of lengths are possible to accommodate other thicknesses of wall board. As can be seen, each surface 16, 18 of the flange 14 may be marked, such as at 49, to identify the thickness of wall board employed with each side.

The benefits of the present invention are detailed with respect to FIGS. 5 and 6.

FIG. 5 shows the flange 14 positioned in one of its two reversible positions for accommodating wall board 25 having a thickness of ⅝". Flange 14 is shown mounted to the edge 27 of the wall 24 of box. Extending boundary portion 42 extends into the interior of box 20. Extending boundary position 40 extends outwardly so that rim 34 is positioned a width $W_2$ from flange 14 (and the edge 27 of box 20). This width $W_2$ is approximately the thickness of a given wall board which in the present invention is ⅝".

Referring now to FIG. 6, the flange 14 is positioned in a reverse position from that shown in FIG. 5. Flange 14 is shown mounted to the edge 27 of box 20 so that extending boundary portion 40 extends into the interior of box 20. Extending boundary portion 42 extends outwardly so that rim 36 is positioned a width $W_1$, from flange 14 (and the edge 27 of box 20). This width $W_1$ is approximately the thickness of a further given wall board which in the present invention is ½".

Thus, the present invention accommodates two thicknesses of wall board 25 flush with the receptacle rim 34, 36 of access member 12 by reversing of flange 14 with respect to box 20. In each instance however, the flange 14 itself is positioned at the same relative position with respect to the box 20 and it is the length of extending portions 40 and 42 which compensate for the different widths of the wall board.

While the bracket 10 of the present invention has been described for use with a conventional electrical outlet box 20 which is mounted to the stud, the bracket 10 as shown in FIGS. 3 and 4 may also be used to attach low voltage components directly to the stud without use of an electrical outlet box. As shown in FIGS. 3 and 4, bracket 10 includes a pair of mounting apertures 50 and 52 extending through flange 14 on one side of access member 10. Access openings 50 and 52 allow the bracket to be mounted directly to the stud using suitable fasteners such as screws or nails. The bracket can be mounted with either surface 16 or 18 of flange 14 against the surface of the stud so that two different thicknesses of wall board can be accommodated directly thereover. As is described above, in the embodiments shown in FIGS. 3 and 4, low voltage termination devices may be secured within bracket 10 by use of mounting elements 37 and 39 without the need for use of an electrical outlet box.

The present invention therefore allows the combination of two different thicknesses of wall board either in applications where an electrical outlet box is used or in applications such as low voltage applications where no electrical outlet box is necessary.

Various changes to the foregoing described and shown structures will now be evident to those skilled in the art. Accordingly, the particularly disclosed scope of the invention is set forth in the following claims.

What is claimed is:

1. A reversible bracket for attachment to an open front face of an outlet box comprising:
   a planar flange having opposed surfaces having a first position with one of said opposed surfaces being attachable to said open front face of said box and a reversible second position with the other of said opposed surfaces being attachable to said open front face of said box; and
   a bounded access member extending through said flange, said access member having an opening extending through said flange between opposite extending rims of said access member, one of said rims being located a first distance from said open front face of said box when said flange is in said first position, and the other of said rims being located at a second distance from said open front face of said box when said flange is in said reversible second position, and said first distance being different from and said second distance.

2. A reversible bracket of claim 1 where said first and second distance are approximately equal distance of different thickness of wall board.

3. In combination a bracket and an electrical junction box comprising: said electrical outlet box having a back wall, a side wall upstanding from and perimetrically bounding said back wall so as to define a box interior and an open face opposite said back wall,: and said bracket having a generally planar flange reversibly positionable on an upper edge of said side wall for spanning said open face of said box, said planar flange having an opening therethrough for accessing said box interior, said opening being bounded by a first extending boundary wall, said first boundary extending wall extending a first distance and in a first direction from said planar flange and a second extending boundary wall extending a second distance and in a second direction from said planar flange, said first distance being different from said second distance and said first direction being opposite said second direction, said first and second boundary walls being alternately insertable into said box interior upon said reversible positioning of said planar flange.

4. A bracket of claim 3 where said first distance approximates the thickness of a first wall board and said second distance approximates the thickness of a second wall board of different thickness.

5. A bracket of claim 3 wherein one of said first and second extending walls is positioned to extend into said box interior.

6. A method of attaching an electrical outlet box, having a box interior and an open front face, to a stud comprising the step of:

provi­ding a bracket having a generally planar flange and an opening therethrough, said opening being bounded by a first extending wall extending from said flange a first direction, and a second extending wall extending from said flange a second distance in a second opposite direction, and first distance being different from said second distance;

attaching said bracket to said electrical outlet box over said open front face with one of said first or second extending walls extending into said box interior; and attaching said box to said stud such that said other of said first or second extending wall extends outwardly from said face of said stud.

7. A method of claim 6 when said order of said first or second extending wall extends a distance which approximates the thickness of a wall board.

* * * * *

UNITED STATES PATENT AND TRADEMARK OFFICE
CERTIFICATE OF CORRECTION

PATENT NO. : 7,151,218 B2
APPLICATION NO. : 10/764105
DATED : December 19, 2006
INVENTOR(S) : Cong Thanh Dinh It is certified that error appears in the above-identified patent and that said Letters Patent is hereby corrected as shown below:

The title page should be deleted and substitute therefor the attached title page.

Drawings:
Delete Figs. 1, 2, 4, 5, and 6 and substitute therefor Figs. 1, 2, 4, 5, and 6 as shown on the attached page.

In Figure 1, previously omitted elements 21, 23, 37, and 39 have been added.

In Figure 2, previously omitted elements 21, 23, 37, and 39 have been added.

In Figure 4, previously omitted elements 37, 39, 50, and 52 have been added. Also, element "42" was replaced with element --40-- and element "40" was replaced with element --42--.

In Figure 5, previously omitted element 14 was added.

In Figure 6, previously omitted element 14 was added. Also, element "34" was replaced with element --36--.

At column 2, line 28, should read --FIGS. 1 and 2 are top perspective views...--.

At column 3, line 62, the patent should read --...wall 24 of box 20.--.

At column 4, line 63 (Claim 2), should read --...second distances are approximately equal...--.

At column 4, line 63 (Claim 2), should read --...equal distance to...--.

At column 4, line 64 (Claim 2), should read --...thicknesses of wall board.--.

At column 4, line 65 (Claim 3), should read --...an electrical outlet box ...--.

UNITED STATES PATENT AND TRADEMARK OFFICE
CERTIFICATE OF CORRECTION

PATENT NO. : 7,151,218 B2
APPLICATION NO. : 10/764105
DATED : December 19, 2006
INVENTOR(S) : Cong Thanh Dinh It is certified that error appears in the above-identified patent and that said Letters Patent is hereby corrected as shown below:

At column 5, line 7 (Claim 3), should read --...said first extending boundary wall ...--.

At column 6, line 6 (Claim 6), should read --...from said flange in a ...--.

At column 6, line 9 (Claim 6), should read --...said first distance being ...--.

At column 6, line 15 (Claim 6), should read --...first or second extending walls extends--.

At column 6, line 18 (Claim 7), should read --...when said other of ...--.

Signed and Sealed this

Sixth Day of May, 2008

JON W. DUDAS
*Director of the United States Patent and Trademark Office*

(12) United States Patent
Dinh (10) Patent No.: US 7,151,218 B2
(45) Date of Patent: Dec. 19, 2006

(54) ELECTRICAL TERMINATION COMPONENT BRACKET

(75) Inventor: Cong Thanh Dinh, Collierville, TN (US)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 10/764,185

(22) Filed: Jan. 23, 2004

(65) Prior Publication Data
US 2005/0082078 A1   Apr. 21, 2005

Related U.S. Application Data

(60) Provisional application No. 60/513,094, filed on Oct. 21, 2003.

(51) Int. Cl.
*H02G 3/08* (2006.01)
(52) U.S. Cl. .................. 174/58; 174/50; 174/53; 248/906
(58) Field of Classification Search ............. 174/50, 174/58, 63; 220/3.7, 3.8; 439/535; 248/906
See application file for complete search history.

(56) References Cited

U.S. PATENT DOCUMENTS

| | | | | |
|---|---|---|---|---|
| 2,808,172 A | * | 10/1957 | Buckels | 220/3.4 |
| 2,989,206 A | * | 6/1961 | McAfee | 220/3.7 |
| 4,854,093 A | | 8/1989 | Kellom | 52/28 |
| 4,927,039 A | * | 5/1990 | McNab | 220/3.7 |
| 5,042,673 A | * | 8/1991 | McShane | 220/3.7 |
| 5,775,032 A | | 7/1998 | Lacy | 52/28 |
| 5,931,325 A | * | 8/1999 | Filipov | 220/3.7 |

* cited by examiner

*Primary Examiner*—Dhiru R. Patel
(74) *Attorney, Agent, or Firm*—Hoffmann & Baron, LLP (57) ABSTRACT

An electrical box bracket is positionable in one of two reversible positions to accommodate wall boards of two different thicknesses. The bracket includes a flange and an access member for providing access therethrough. In one of the two reversible positions, the access member accommodates wall board of one thickness and in the other reversible position the access member accommodates wall board of the other thickness. The bracket may be mounted directly to a stud or can be mounted to an outlet box which is attached to the stud.

7 Claims, 5 Drawing Sheets